(12) United States Patent
Kim et al.

(10) Patent No.: US 8,274,636 B2
(45) Date of Patent: Sep. 25, 2012

(54) METHOD FOR FORMING SPACERS ON SUBSTRATE

(75) Inventors: Min-Joo Kim, Seoul (KR); Jeong-Hyun Kim, Gyeonggi-Do (KR); Myoung-Ho Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 1143 days.

(21) Appl. No.: 11/271,266

(22) Filed: Nov. 8, 2005

(65) Prior Publication Data

US 2006/0187399 A1 Aug. 24, 2006

(30) Foreign Application Priority Data

Feb. 23, 2005 (KR) .................. 10-2005-0015138

(51) Int. Cl.
*G02F 1/13* (2006.01)
*G02F 1/1339* (2006.01)

(52) U.S. Cl. ........................ 349/155; 349/187

(58) Field of Classification Search .......... 349/106–111, 349/155–157, 187
See application file for complete search history.

(56) References Cited

U.S. PATENT DOCUMENTS

| | | | | |
|---|---|---|---|---|
| 4,362,771 | A * | 12/1982 | Umeda et al. ................ | 428/1.6 |
| 7,061,568 | B2 * | 6/2006 | Yamaguchi et al. .......... | 349/155 |
| 7,265,806 | B2 * | 9/2007 | Ueda ............................ | 349/155 |
| 2003/0214620 | A1 * | 11/2003 | Kim et al. .................... | 349/155 |
| 2004/0109126 | A1 * | 6/2004 | Washizawa et al. .......... | 349/155 |
| 2004/0175860 | A1 | 9/2004 | Park et al. | |
| 2004/0263765 | A1 * | 12/2004 | Han et al. ..................... | 349/155 |

FOREIGN PATENT DOCUMENTS

| | | |
|---|---|---|
| JP | 11-024083 | 1/1999 |
| JP | 11-065479 | 3/1999 |
| JP | 11-281985 | 10/1999 |
| JP | 2001-188235 | 7/2001 |
| JP | 2003-114438 | 4/2003 |
| JP | 2003-270640 | 9/2003 |
| JP | 2003270640 A * | 9/2003 |
| JP | 2004-125878 | 4/2004 |
| JP | 2004170537 A * | 6/2004 |

OTHER PUBLICATIONS

Office Action issued in corresponding Taiwanese Patent Application No. 94139273; mailed Mar. 12, 2009.
Office Action issued in corresponding Japanese Patent Application No. 2005-379059; mailed Aug. 3, 2009.
Office Action issued in corresponding Japanese Patent Application No. 2005-379059; mailed Jan. 6, 2010.

* cited by examiner

*Primary Examiner* — Jessica M Merlin
(74) *Attorney, Agent, or Firm* — Brinks Hofer Gilson & Lione

(57) ABSTRACT

A method of forming a spacer for a liquid crystal display (LCD) device is disclosed. To form the spacer, an ink jet injection nozzle is aligned over a substrate on which unit pixels are arranged in a matrix. After aligning the nozzle, first dispensing spacers are dispensed from the injection nozzle with a certain gap so that at least one unit pixels is interposed between the spacers. Subsequently, the nozzle is moved and second dispensing spacers are dispensed by the nozzle at each of the unit pixels formed between the first spacers. This is repeated until the spacer is formed at all unit pixels. The spacer contains a ball spacer and a volatile liquid, which is vaporized during dispensing. The ink jet injection method prevents adjacent spacers from interfering with each other during formation.

10 Claims, 3 Drawing Sheets

METHOD FOR FORMING SPACERS ON SUBSTRATE

TECHNICAL FIELD

The present application relates to a spacer forming method, and more particularly, to a ball spacer forming method using an ink jet injection method.

BACKGROUND

As various mobile electronic devices including a mobile phone, a PDA or a notebook computer are being developed, demands for light, thin, short and small flat panel display devices that can be applied to the mobile electronic devices are increasing. As a result, research for flat panel display devices such as an LCD (Liquid Crystal Display), PDP (Plasma Display Panel), an FED (Field Emission Display), a VFD (Vacuum Fluorescent Display) is actively ongoing. Of these displays, the LCD is the most prevalent because of its implementation in mass-production techniques, ease of a driving unit, and high picture quality.

The LCD device comprises an array substrate that unit pixels are arranged in a matrix form, a color filter substrate facing the array substrate for displaying colors in natural colors, and a liquid crystal layer contained between the two substrates.

The array substrate and the color filter substrate are bonded to each other by a sealant at edges thereof, and a cell gap is formed therebetween. The cell gap between the array substrate and the color filter substrate is maintained by a spacer.

The spacer serves to maintain a cell gap between an upper substrate and a lower substrate of an LCD panel, and may be divided into a ball spacer and a column spacer (or a pattern spacer) according to a spacer forming method.

The ball spacer is formed on the upper substrate or the lower substrate by a dispensing minute ball shapes along the substrate. The column spacer, on the other hand, is formed by exposing and developing of a photosensitive layer.

A method of forming the ball spacer includes a wet dispensing method, in which the spacer is mixed with alcohol, etc. and then dispensed, or a dry dispensing method for dispensing only the spacer. The dry dispensing method includes an electrostatic dispensing method using static electricity, or an electrostatic discharge dispensing method using an injection pressure of gas. Generally, the electrostatic discharge dispensing method is mainly applied to the LCD panel susceptible to static electricity.

A spacer is formed easily by the dispensing method of ball spacer. However, the dispensing method has disadvantages that a spacer is not formed at a desired position and a forming density of a spacer is not uniform.

By the dispensing method, a spacer may be formed in a unit pixel portion thus to decrease an aperture ratio, or dispensed spacers may be lumped to each other thus to cause problems with the screen.

On the other hand, the column spacer is formed by a photo mask process. Accordingly, a forming position of the column spacer may be freely controlled, and a density and a shape of the spacer may be freely controlled. However, due to the photo process, an amount of a photosensitive material coated on a substrate to form a spacer is wasted thus increasing production cost and environment pollution. Also, an expensive mask is used and several additional processes have to be performed for the photo process.

BRIEF DESCRIPTION

By way of introduction only, in one embodiment a spacer forming method comprises: aligning an ink jet injection nozzle over a substrate on which unit pixels are arranged in a matrix form; first dispensing spacers with a predetermined distance so that at least one unit pixels may be interposed between the spacers; and second dispensing spacers between the first dispensed spacers.

The foregoing brief description is merely a summary of embodiment(s) of the present disclosure and is in no manner intended to limit the scope of the invention recited in the claims. Further aspects of the disclosure will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to the preferred embodiments of the present invention, examples of which are illustrated in the accompanying drawings.

A liquid crystal display (LCD) panel comprises an upper substrate and a lower substrate attached to each other, and liquid crystal contained therebetween. In the LCD panel, a cell gap between the upper substrate and the lower substrate is maintained uniformly by a spacer. The spacer is formed at a precise position using an ink jet dispensing method.

As the LCD panel becomes larger, more minute spacers of a high density are formed in order to maintain a cell gap of the LCD panel uniformly. As the density of the spacers increases, the chances of aggregation likewise increase due to a narrow dispensing distance therebetween. The ink jet dispensing method is capable of forming spacers having a high density and capable of preventing the spacers from being aggregated.

The spacer forming method comprises dispensing spacers between unit pixels separated by at least one unit pixel therebetween, and after hardening the spacer, dispensing other spacers at each unit pixel formed between the first spacers, thereby forming spacers at each unit pixel.

The first dispensed spacers dispensed before the second dispensing are hardened after being dried, thus reducing aggregation of the second dispensed spacer to the first dispensed spacer and thereby easily forming the spacers at a precise position. If the disposed spacers are relatively large and the unit pixel is small, adjacent spacers disposed at the unit pixels easily adhere and aggregate to each other when the spacers are dispensed. As disclosed herein, however, since first spacers dispensed are separated by at least one unit pixel and the second spacers are dispensed between the first dispensed spacers, the first and second dispensed spacers are not likely to adhere or aggregate.

Hereinafter, a structure of the present LCD panel will be explained with reference to FIGS. 2 and 3. Also, a method for forming a spacer by an ink jet method either on an upper substrate or on a lower substrate constituting the LCD panel will be explained with reference to FIGS. 4A to 4C.

Figure 1:
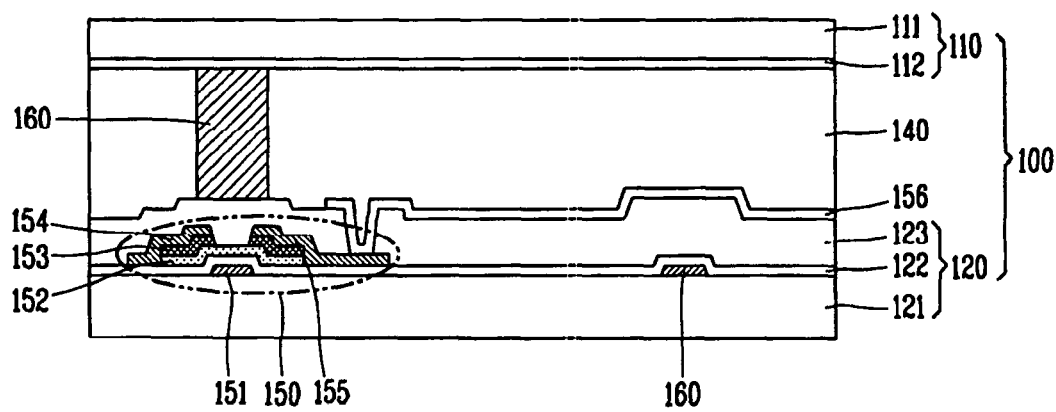
FIG. 1 is a sectional view showing a liquid crystal display (LCD) panel according to one embodiment of the present invention.

FIG. 1 is a sectional view showing a liquid crystal display (LCD) panel according to the present invention.

As shown, a liquid crystal display (LCD) panel 100 comprises a TFT array substrate 120, a color filter substrate 110, and a liquid crystal layer 140 contained between the TFT array substrate 120 and the color filter substrate 110.

On the TFT array substrate 120, a TFT 150 and a storage capacitor are formed as one pair. The TFT 150 drives the unit pixels. The storage capacitor maintains a signal applied to the unit pixel for a certain time.

The TFT array substrate 120 comprises a gate electrode 151, a gate insulating layer 122 for insulating the gate electrode 151, a semiconductor layer 152 formed on the gate insulating layer 122 and constituting an active layer including TFT channel and source/drain regions, an ohmic contact layer 153 for ohmic-contacting the semiconductor layer 152 to source/drain electrodes 154 and 155, and the source/drain electrodes 154 and 155 for receiving data signals.

The source/drain electrodes 154 and 155 are protected by a passivation layer 123. On the passivation layer 123, a pixel electrode 156 for applying an electric field to the liquid crystal layer 140 is formed. The pixel electrode 156 is connected to the drain electrode 155 thus receiving data signals.

The storage electrode 160 forms a capacitor with the pixel electrode 156 formed thereon, thereby maintaining data signals applied to the TFT for a certain time.

The color filter substrate 110 facing the TFT array substrate 120 may be constructed as a color filter layer (not shown) is formed on a transparent substrate 111 and a common electrode 112 for applying an electric field to liquid crystal is formed on the color filter layer. The common electrode 112 may be constituted with a transparent electrode such as ITO, etc.

Figure 2:
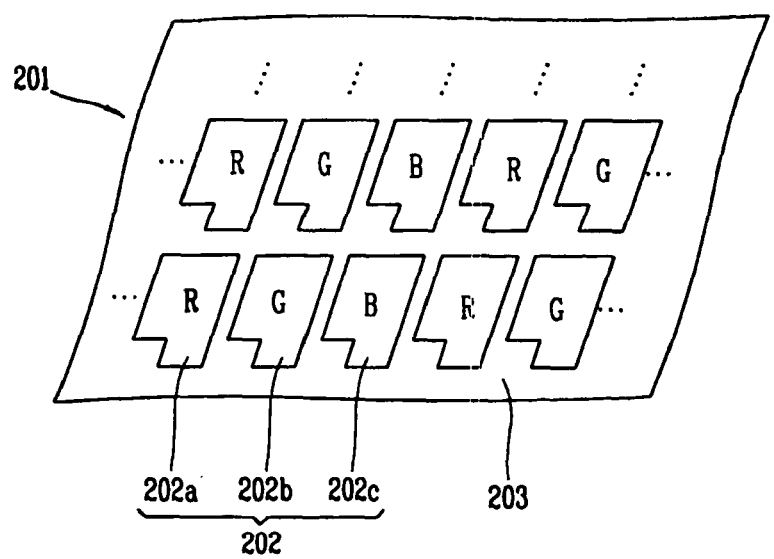
FIG. 2 is a plan view showing a color filter substrate according to one embodiment of the present invention.

Referring to FIG. 2, a plan view of a color filter substrate, the upper substrate of a present LCD panel will be explained. A color filter substrate 201 includes a plurality of sub color filters 202a(Red), 202b(Green), and 202c(Blue) arranged in a matrix. The Red, Green, and Blue sub color filters 202a, 202b, and 202c constitute one unit pixel 202.

The sub color filters 202a, 202b, and 202c are spaced from each other uniformly, and a black matrix layer 203 for preventing light leakage from occurring between the sub color filters 202a, 202b, and 202c is formed between the sub color filters 202a, 202b, and 202c.

Although not shown, a common electrode is also formed on the color filter layer. The common electrode and the pixel electrode 156 of the array substrate 120 are used to apply an electric field to the liquid crystal 140.

In a non-high resolution LCD panel of 15 inches, the sub color filter 202a, 202b, and 202c formed in the sub unit pixel generally has a horizontal size of approximately 100 μm and a vertical size of approximately 200 to 300 μm. Therefore, the sub color filters 202a, 202b, and 202c are arranged to each other with a gap of approximately 100 μm. For a high resolution LCD panel, the size of the unit pixel decreases.

Figure 3:
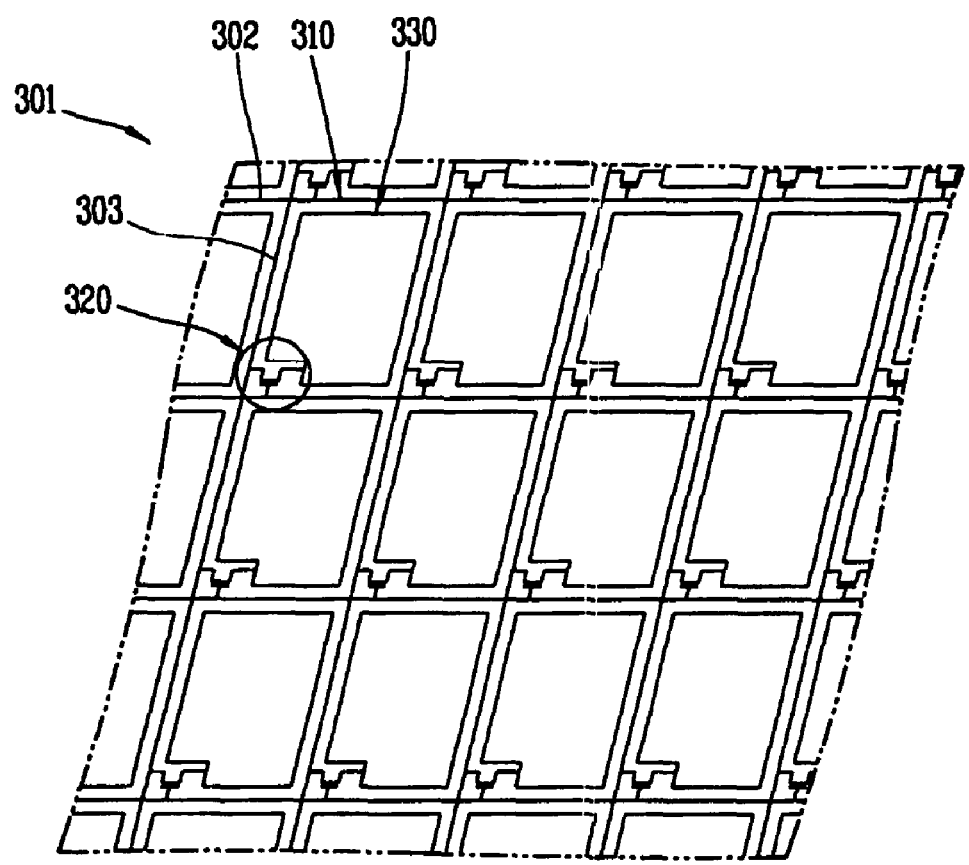
FIG. 3 is a plan view showing an array substrate according to one embodiment of the present invention.

FIG. 3 is a plan view showing an array substrate 301 facing the color filter substrate 201. Referring to FIG. 3, on the array substrate 301, a plurality of gate lines 302 and a plurality of data lines 303 perpendicular to the gate lines 302 are formed to define unit pixels 310. The unit pixels 310 are arranged on the array substrate 301 in a matrix.

The unit pixel 310 is provided with a thin film transistor 320 as a switching device which is respectively connected to the gate lines 302 and the data lines 303. A drain electrode of the thin film transistor 320 is connected to a pixel electrode 330 of each unit pixel thus to receive data signals.

The unit pixels of the array substrate 301 respectively correspond to the sub color filters 202a, 202b, and 202c of the color filter substrate 201. When the two substrates 201, 301 are attached to each other, the unit pixels 310 drive liquid crystal 140 contained between the color filter substrate 201 and the array substrate 301 as the pixel electrode 330 of the array substrate 301 and the common electrode of the color filter substrate 201 form an electric field therebetween.

A constant cell gap is maintained between the color filter substrate 201 and the array substrate 301 using a spacer. The constant cell gap permits a uniform picture quality to be implemented. The spacer is formed by a simple ink jet method that is capable of controlling a dispensing position of a spacer.

In the ink jet injection method, a volatile solvent including ball spacers is dispensed onto a substrate, and the solvent is volatilized to form a spacer. For a high resolution LCD panel, a gap distance between sub unit pixels is decreased. However, it is difficult to fabricate injection ports of an ink jet injection nozzle dispensing spacers with such a small uniform gap distance between the sub unit pixels. Also, even if the injection ports having a minute gap distance are fabricated, dispensed spacers that are melted in a solvent may be aggregated to each other to form inferior spacers. That is, as the solvent spreads onto the unit pixel and the spacer is formed at the unit pixel, an aperture ratio is decreased or a stain remains on the unit pixel after the solvent is volatilized.

Therefore, the present invention provides a spacer forming method using an ink jet method capable of forming a spacer at each unit pixel and capable of preventing the spacers from being adhered to each other in fabrication of a high resolution LCD panel.

In the present invention, a first spacer dispensing is performed with a wide gap distance between spacers, and then a second spacer dispensing is performed between the first dispensed spacers to prevent the adhesion of the spacers.

The first dispensed spacer is scarcely adhered to the second dispensed spacer since a volume of the dispensed solvent including first spacers is volatilized and the first spacers are hardened before the second spacers are dispensed.

Hereinafter, a spacer forming method using an ink jet injection method according to the present invention will be explained with reference to FIGS. 4A to 4C.

In the present invention, a spacer may be dispensed either on the color filter substrate or on the array substrate. As shown, the spacer is dispensed on the color filter substrate.

Figure 4A:
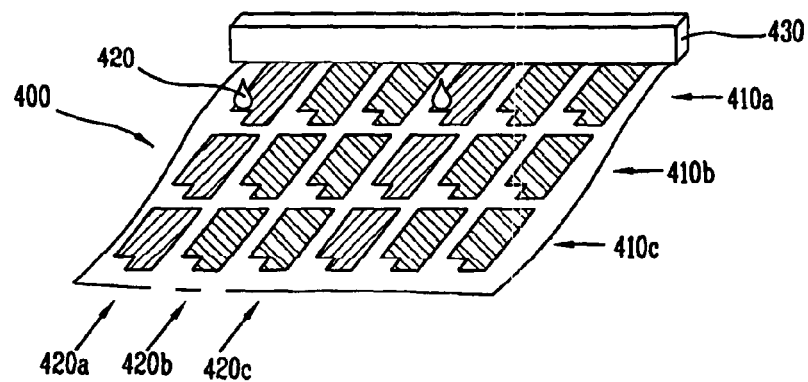
FIGS. 4A to 4C are detail descriptions of showing a spacer forming method according to one embodiment of the present invention.

Referring to FIG. 4A, an ink jet injection nozzle 430 is arranged on a color filter substrate 400 with a constant gap. The ink jet injection nozzle 430 has a bar shape and is provided with a plurality of injection ports.

The uniform gap distance between the injection ports may correspond to at least every two sub pixels or three sub pixels. That is, if length of the sub pixel 100 μm, the gap distance between the injection ports of the nozzle 430 may be about 200 μm or 300 μm. However, the gap distance between the injection ports is not limited to the above size, but may be constructed in various manners.

The ink jet injection nozzle 430 is aligned above the color filter substrate 400. A first spacer dispensing is then performed.

A spacer 420 contains a ball spacer melted in a volatile solvent such as alcohol, etc. The spacer 420 is dropped onto the color filter substrate 400 in a mixed state between the solvent and the ball spacer. The spacer 420 is dropped at a region where a black matrix is formed except a unit pixel region in order not to decrease an aperture ratio of the unit pixel. Therefore, one first dispensed spacer is formed on the color filter substrate with a uniform gap distance corresponding to at least every two sub pixels. FIG. 4A shows that one spacer is dispensed every three sub pixels according to one embodiment of the present invention.

Since the dropped spacer 420 includes a volatile solvent, the spacer is volatilized upon being dropped. Therefore, after the volatile solvent is volatilized only the ball spacer remains. As the result, the dropped spacer has a very small volume.

The ink jet injection nozzle 430 disperses a spacer 420 onto a first line 410a of the sub color filter, and then moves with a predetermined distance in a Y direction. Then, the spacer 420 is dropped onto a second line 410b of the sub color filter. Then, the spacer 420 is dropped onto a third line 410c of the sub color filter.

When moving in the Y-direction, the ink jet injection nozzle may move with a distance corresponding to at least two sub pixels and then spacers may be dropped.

However, in the preferred embodiment, a vertical length of the sub pixel is sufficiently long such that spacers dropped in the vertical direction are not adhered to each other and spacers are formed at every line by an ink jet injection method.

As shown in FIG. 4A, a first spacer dispensing is performed every three sub pixels, as shown, the $3n^{th}$ column 420a. The ink jet injection nozzle 430 is moved in an X direction with a uniform gap distance (the gap corresponding to a horizontal length of the sub unit pixel) thereby to perform a second spacer dispensing.

Figure 4B:
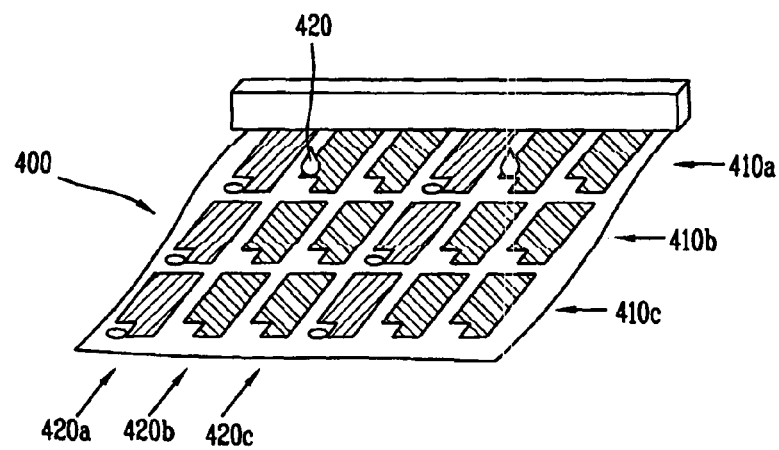
Figure 4C:
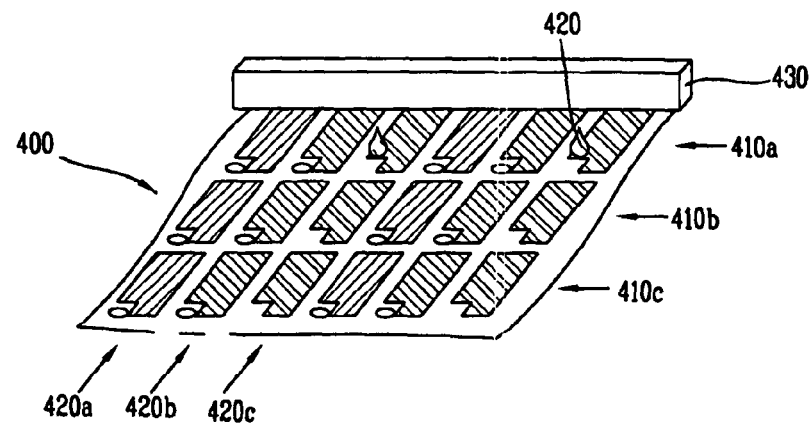

As shown in FIG. 4B, a second spacer dispensing is performed between the first spacers formed by the first spacer dispensing.

The first dispensed spacer has a very small volume since the solvent thereof has been volatilized and it has been hardened, and is not adhered to the second dropped spacer including a solvent.

The second dispensing is performed at of the sub pixel regions between the spacers formed by the first dispensing. Referring to FIG. 4B, the second dispensing is performed at every three column, that is, the $3n+1^{th}$ column 420b of the sub pixels arranged in a matrix form. The ink jet injection nozzle 430 is moved in the Y direction by the vertical length of the sub pixels, and then the second dispensing is performed on the entire substrate.

The ink jet injection nozzle 430 is moved in the X direction by the horizontal length of the sub pixels, and then a third dispensing is performed on the entire substrate. The third dispensing is performed in the same manner as the first dispensing and the second dispensing at the $3n+2^{th}$ column 420c of the sub pixels.

As the result, at least one ball spacer is formed at every sub unit pixel on the color filter substrate of the LCD panel. Accordingly, in fabricating a high resolution LCD panel in which the sub unit pixels are arranged with a minute gap, spacers can be formed on each sub unit pixel by an economical and easy ink jet method. Also, the adjacent spacers do not interfere with each other and thus do not adhere to each other due to the minute pixels.

As aforementioned, in the present invention, a spacer can be formed at a desired position by an ink jet injection method. The ink jet injection method is more economical when compared with a column spacer forming method, and can form a spacer at a precise position when compared with a ball spacer forming method by an injection method. Also, at the time of forming spacers at each sub pixel arranged with a minute gap, the adjacent spacers do not interfere with each other and thus do not adhere to each other. Accordingly, picture quality problems such as stain are not generated on the LCD panel.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A spacer forming method for a liquid crystal display (LCD) device having an LCD substrate on which unit pixels are arranged in a matrix, the method comprising:
   aligning an ink jet injection nozzle over the LCD substrate;
   dispensing first spacers having a volatile solvent including ball spacers onto the substrate such that at least two unit pixels are interposed between the first spacers, wherein each of the first spacers is aligned at a non-pixel region corresponding to a thin film transistor region of each unit pixel, and wherein the dispensing first spacers is performed with a gap distance between the first spacers such that the first spacers do not interfere with adjacent first spacers;
   hardening the first spacers, wherein the volatile solvent is volatilized and the ball spacers remain, so that the first spacers do not adhere to where second spacers are dispensed, wherein a volume of each hardened first spacer is smaller than that of each dispensed first spacer;
   dispensing second spacers having a volatile solvent including ball spacers onto one of the unit pixels of the substrate between the hardened first spacers, wherein each of the second spacers is aligned at a non-pixel region corresponding to a thin film transistor region of one of the unit pixels between the hardened first spacers;
   hardening the second spacers between the hardened first spacers, wherein the volatile solvent is volatilized and the ball spacers remain, so that the adjacent first and second spacers do not adhere to each other, wherein a volume of each hardened second spacer is smaller than that of each dispensed second spacer;
   dispensing third spacers having a volatile solvent including ball spacers onto another of the unit pixels of the substrate between the hardened first spacers, wherein each of the third spacers is aligned at a non-pixel region corresponding to a thin film transistor region of another of unit pixels between the dispensed first spacers; and
   hardening the third spacers between the hardened first and second spacers, wherein the volatile solvent is volatilized and the ball spacers remain, so that the adjacent first to third spacers do not adhere to each other, wherein a volume of each hardened third spacer is smaller than that of each dispensed third spacer.

2. The method of claim 1, wherein the ink jet injection nozzle is provided with a plurality of injection ports arranged with a uniform distance therebetween.

3. The method of claim 2, wherein the distance between adjacent injection ports is larger than twice a width of a unit pixel.

4. The method of claim 1, wherein the first, second and third spacers are dispensed onto a TFT array substrate of the LCD device.

5. A spacer forming method for a liquid crystal display (LCD) device having an LCD substrate on which unit pixels are arranged, the method comprising:
- aligning an ink jet injection nozzle over the LCD substrate, the ink jet injection nozzle having ports that are separated by at least two unit pixels;
- dispensing first spacers having a volatile solvent including ball spacers through the ports onto the substrate, wherein each of the first spacers is aligned at a non-pixel region corresponding to a thin film transistor region of each unit pixel, wherein the dispensing first spacers is performed with a gap distance between the first spacers such that the first spacers do not interfere with the adjacent first spacers;
- hardening the first spacers, wherein the volatile solvent is volatilized and the ball spacers remain, so that the first spacers do not adhere to where second spacers are dispensed, wherein a volume of each hardened first spacer is smaller than that of each dispensed first spacer;
- realigning the ink jet nozzle such that the ports are disposed over one of the unit pixels of the LCD substrate between the hardened first spacers;
- dispensing second spacers having a volatile solvent including ball spacers onto one of the unit pixels of the substrate between the hardened first spacers, wherein each of the second spacers is aligned at a non-pixel region corresponding to a thin film transistor region of one of the unit pixels between the hardened first spacers;
- hardening the second spacers between the hardened first spacers, wherein the volatile solvent is volatilized and the ball spacers remain, so that the adjacent first and second spacers do not adhere to each other, wherein a volume of each hardened second spacer is smaller than that of each dispensed second spacer;
- realigning the ink jet nozzle such that the ports are disposed over another of the unit pixels of the LCD substrate between the hardened first spacers;
- dispensing third spacers having a volatile solvent including ball spacers onto another of the unit pixels of the substrate between the hardened first spacers, wherein each of the third spacers is aligned at a non-pixel region corresponding to a thin film transistor region of another of the unit pixels between the hardened first spacers; and
- hardening the third spacers between the hardened first and second spacers, wherein the volatile solvent is volatilized and the ball spacers remain, so that the adjacent first to third spacers do not adhere to each other, wherein a volume of each hardened third spacer is smaller than that of each dispensed third spacer.

6. The method of claim 5, wherein the first, second and third spacers are dispensed onto a TFT array substrate of the LCD device.

7. The method of claim 5, wherein the first, second and third spacers are dispensed onto a color filter substrate of the LCD device.

8. A method of forming a spacer in a liquid crystal display (LCD) device having an LCD substrate on which unit pixels are arranged, the method comprising:
- aligning an ink jet injection nozzle over the LCD substrate, wherein the ink jet injection nozzle is provided with a plurality of injection ports arranged with a uniform distance therebetween and, wherein the distance between adjacent injection ports is larger than twice a width of a unit pixel;
- dispensing first spacers having a volatile solvent including ball spacers onto the substrate such that the first spacers do not interfere with each other, wherein each of the first spacers is aligned at a non-pixel region corresponding to a thin film transistor region of each unit pixel, wherein the dispensing first spacers is performed with a gap distance between the first spacers such that the first spacers do not interfere with adjacent first spacers;
- hardening the first spacers, wherein the volatile solvent is volatilized and the ball spacers remain, so that the first spacers do not adhere to where second spacers are dispensed, wherein a volume of each hardened first spacer is smaller than that of each dispensed first spacer;
- dispensing second spacers having a volatile solvent including ball spacers onto one of the unit pixels of the substrate between the hardened first spacers such that the hardened second spacers do not interfere with each other, wherein each of the second spacers is aligned at a non-pixel region corresponding to a thin film transistor region of one of the unit pixels between the hardened first spacers;
- hardening the second spacers between the hardened first spacers, wherein the volatile solvent is volatilized and the ball spacers remain, so that the adjacent first and second spacers do not adhere to each other, wherein a volume of each hardened second spacer is smaller than that of each dispensed second spacer;
- dispensing third spacers having a volatile solvent including ball spacers onto another of the unit pixels of the substrate between the hardened first spacers, wherein each of the third spacers is aligned at a non-pixel region corresponding to a thin film transistor region of another of unit pixels between the dispensed first spacers; and
- hardening the third spacers between the hardened first and second spacers, wherein the volatile solvent is volatilized and the ball spacers remain, so that the adjacent first to third spacers do not adhere to each other, wherein a volume of each hardened third spacer is smaller than that of each dispensed third spacer.

9. The method of claim 8, wherein the first and second spacers are dispensed onto a TFT array substrate of the LCD device.

10. The method of claim 8, wherein the first and second spacers are dispensed onto a color filter substrate of the LCD device.

* * * * *